United States Patent [19]

Cover et al.

[11] 3,874,498
[45] Apr. 1, 1975

[54] APPARATUS FOR AND METHOD OF ORIENTING ARTICLES HAVING AT LEAST ONE TAPERED END

[75] Inventors: Paul F. Cover, Westminster; John W. Rife, Severna Park; Clyde F. Kemper, Westminster, all of Md.

[73] Assignee: The United Company, Westminster, Md.

[22] Filed: July 20, 1972

[21] Appl. No.: 273,405

[52] U.S. Cl.................. 198/254, 198/268, 198/279
[51] Int. Cl............................................ B65g 47/00
[58] Field of Search....... 198/33 R, 33 AA, 220 BA, 198/165, DIG. 12, 33 AD, 254, 268, 278, 279; 221/171, 172; 193/43 A, 43 B, 43 C, 43 R

[56] References Cited
UNITED STATES PATENTS

| 676,761 | 6/1901 | Morris............................ 198/33 AD |
| 762,940 | 6/1904 | Poignant............................ 193/43 A |
| 1,556,469 | 10/1925 | Alderman............................ 193/43 B |
| 1,743,062 | 1/1930 | Hiller et al............................. 198/52 |
| 2,361,111 | 10/1944 | Light................................ 221/171 X |
| 3,106,281 | 10/1963 | Mottin ............................ 198/33 AD |
| 3,224,552 | 12/1965 | McNeill ........................... 198/33 AD |
| 3,462,001 | 8/1969 | Boyce.............................. 198/165 X |

FOREIGN PATENTS OR APPLICATIONS

| 1,091,207 | 11/1967 | United Kingdom............ 198/33 AD |
| 1,015,712 | 1/1966 | United Kingdom................ 221/172 |

Primary Examiner—Evon C. Blunk
Assistant Examiner—Douglas D. Watts
Attorney, Agent, or Firm—Diller, Brown, Ramik & Wight

[57] ABSTRACT

This disclosure relates to apparatus for orienting objects, particularly corn, which have at least one tapered end by providing first means for conveying such objects along a first path in a first direction, second means for conveying the objects along a second path in a second direction opposite to the first direction, and means between the first and second conveying means for orienting the objects such that substantially all the objects conveyed by the second conveying means have like contoured ends leading, the orienting means including first, second and third cooperative orienting means, the first cooperative orienting means including means defining a guide surface for directing objects from the first to the second conveying means, the second cooperative orienting means includes means defining a support surface along which the subjects move downwardly along an incline from the first to the second conveying means, and the third cooperative orienting means includes at least a pair of adjacent upper flights of the second conveying means with the flight remote from the first conveying means being higher than the flight more adjacent thereto, and said apparatus further including final orienting means defined by at least a pair of upper flights of said second conveying means diverging in the direction of travel thereof.

39 Claims, 16 Drawing Figures

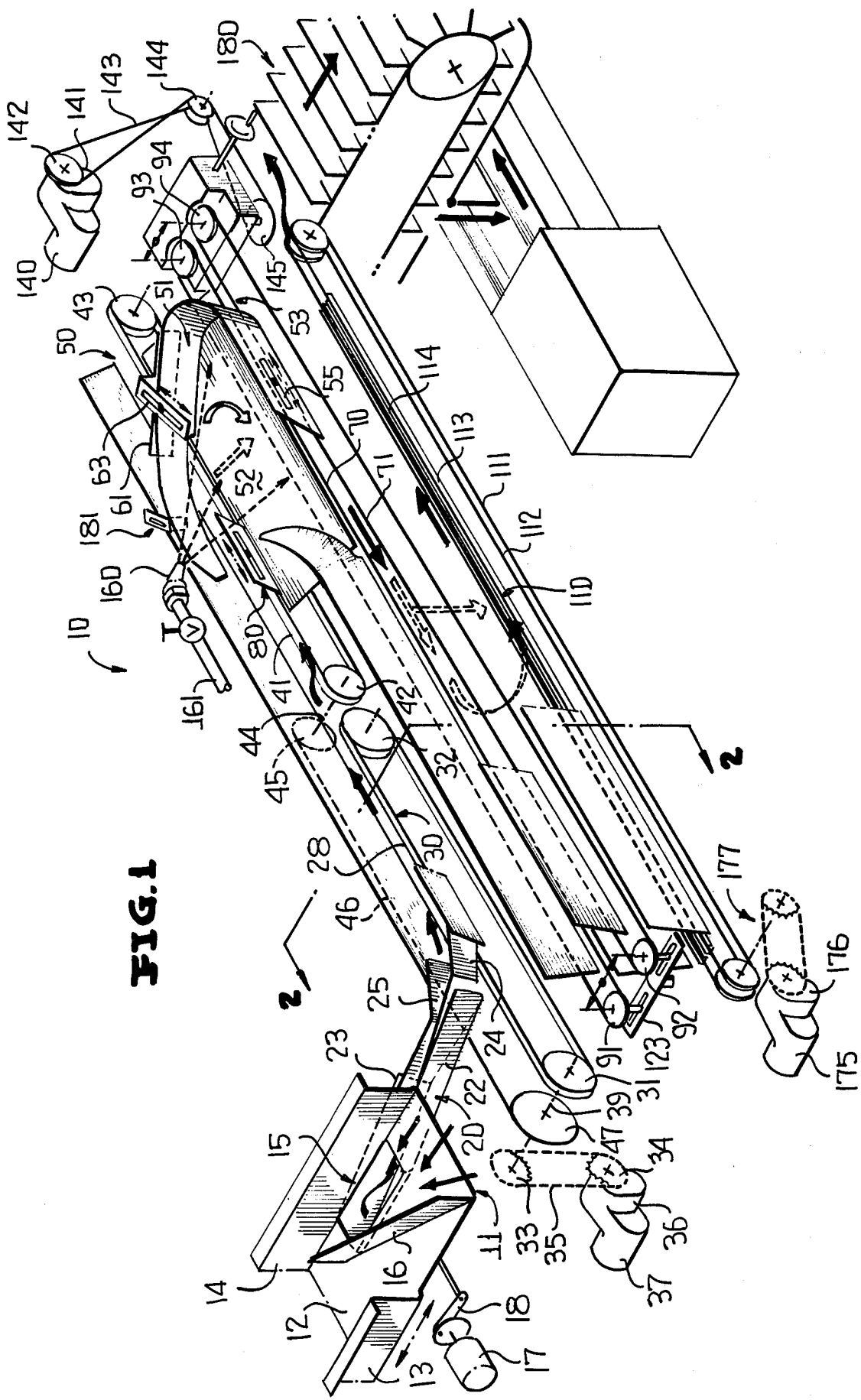

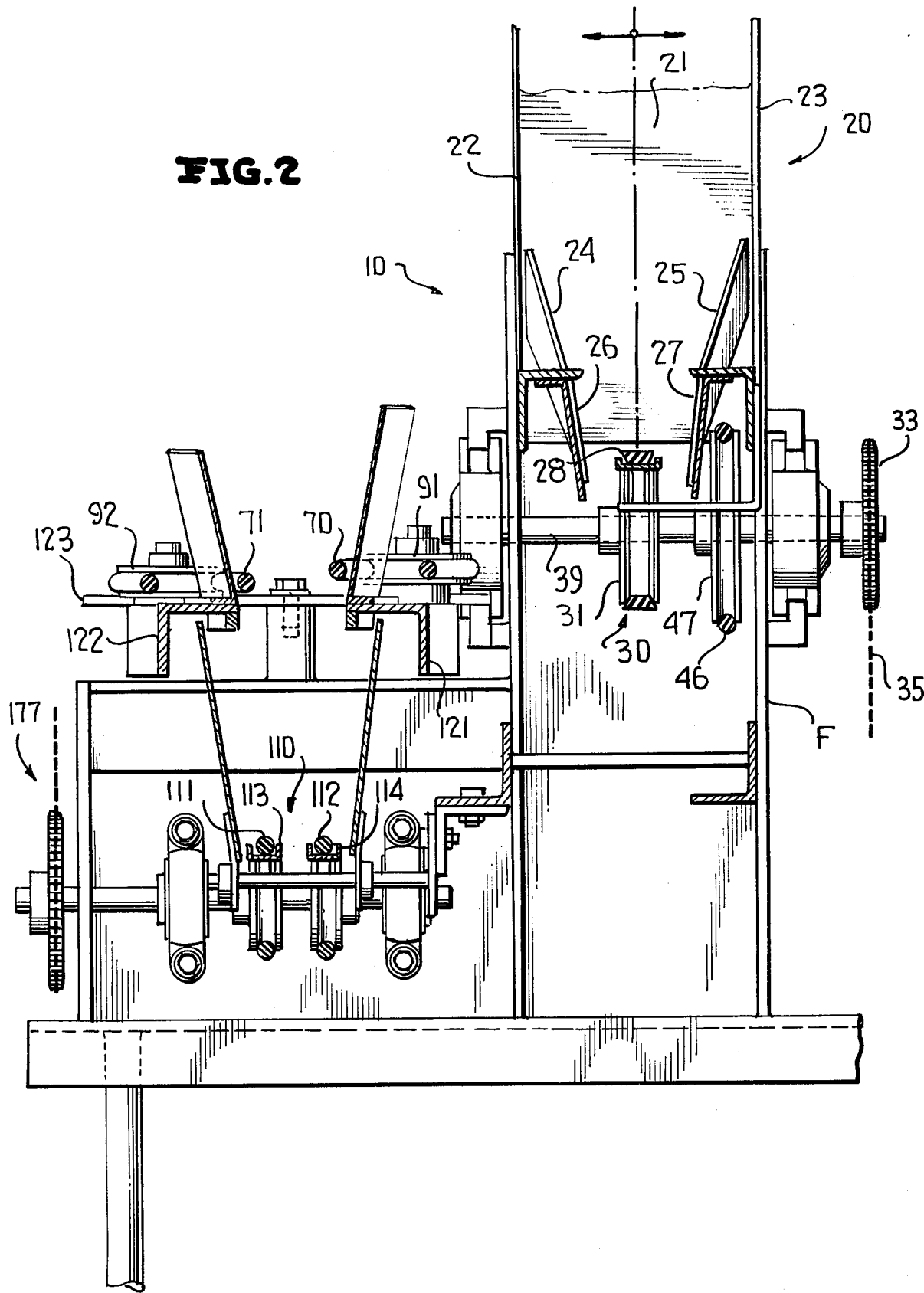

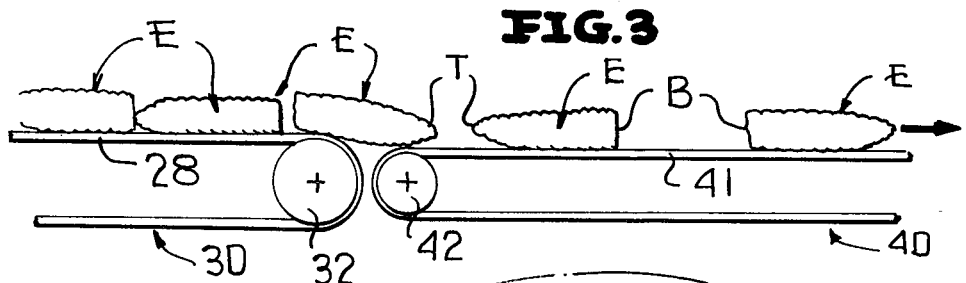
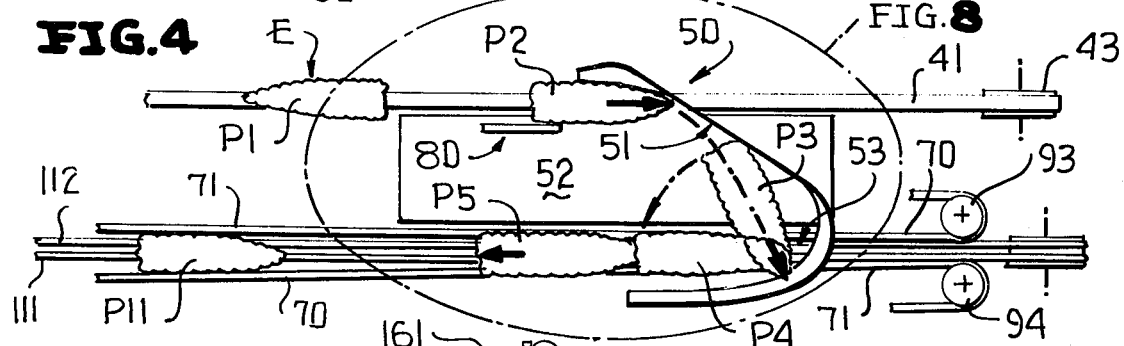
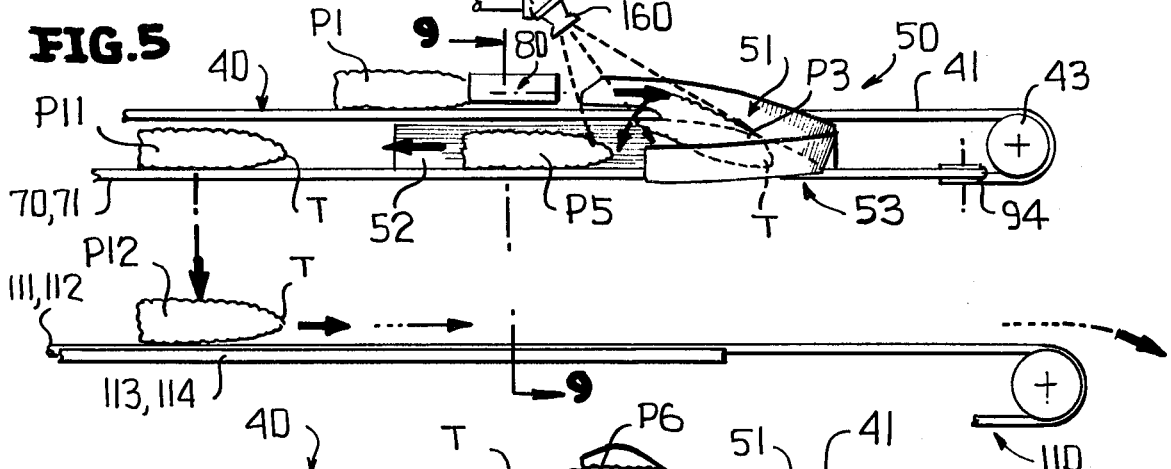
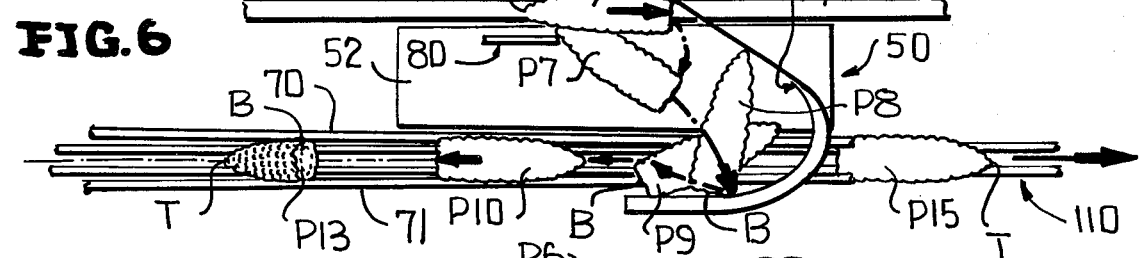
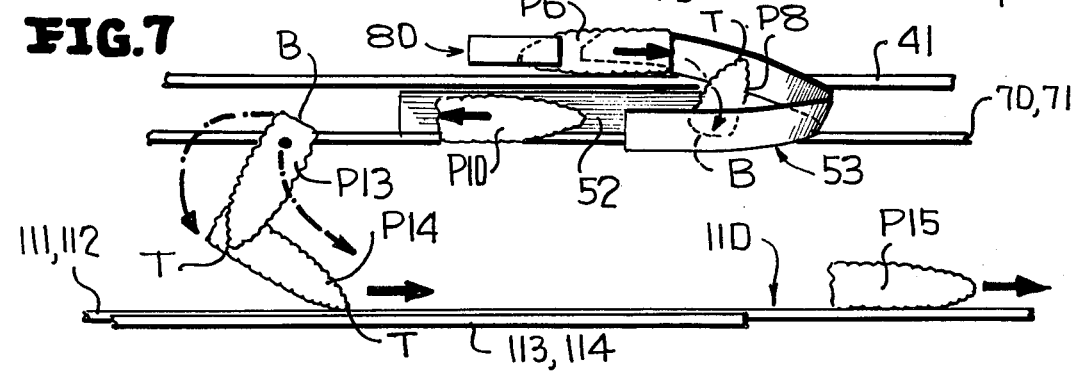

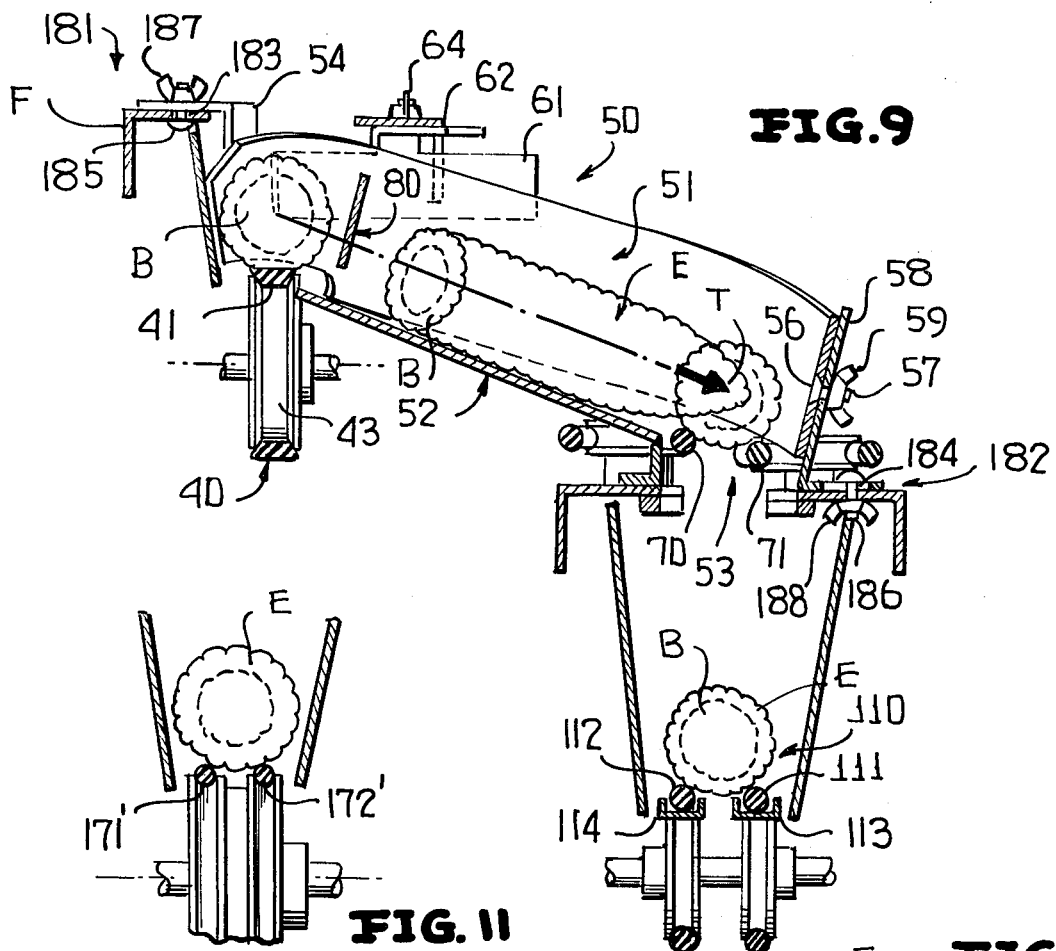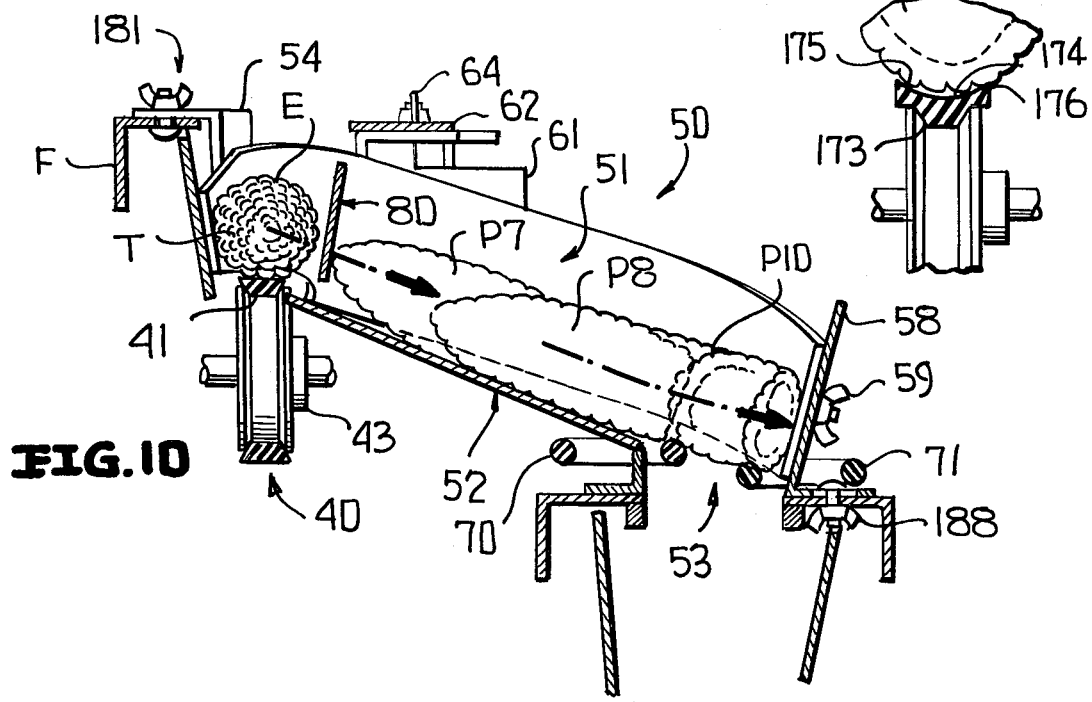

APPARATUS FOR AND METHOD OF ORIENTING ARTICLES HAVING AT LEAST ONE TAPERED END

The present invention is particularly directed to apparatus for and methods of orienting objects which have at least one tapered end, particularly corn whether husked or unhusked, although the apparatus is equally adapted to orient other articles such as carrots, textile bobbins, etc. Though orienting apparatus for partially tapered or fully tapered articles is known most are acceptable only if the objects to be oriented are of exceptionally uniform contour and condition. Unique problems develop when the objects to be oriented are ears of husked or unhusked corn which are fed to most commercial machinery tapered end leading. For example, unhusked and husked ears of corn can be fed to conventional huskers and cutters, respectively, tip end first which is particularly more desirable in the case of cutters to obtain optimum kernel removal per corn ear. Irrespective of the particular end which is fed to the processing machinery various factors must be contended with if corn or similar produce (carrots) are to be properly fed to processing machinery as, for example, variations in diameter, length, taper, etc. depending upon growing conditions, seasonal variations, different varities of the same product, mutations, etc. Even assuming absolute uniformity of contour, there is ample variety to create problems simply because of such conditions as non-uniformity of field conditions, and the usual damage to the ears between picking and the subsequent transporting, storing, conveying and the eventual processing. A broken ear of corn, be it husked or unhusked, might be simply a cylindrical portion or a tapered portion and thus would not conform to the norm accepted by standard orienters.

In keeping with the foregoing, it is a primary object to provide a novel orienting apparatus which though designed primarily for the orienting of husked or unhusked ears of corn is likewise adaptable to any object having at least one tapered end, the apparatus being particularly characterized by first and second orienting means, the first of which includes first, second and third cooperative orienting portions. First conveying means convey objects to the first cooperative orienting portion which is a curved guide surface forming a transition path between the first conveying means and a second conveying means travelling in an opposite direction, the second cooperative orienting means includes a support surface inclined downwardly from the first conveying means to the second conveying means, and a third cooperative orienting means are a pair of adjacent upper flights of the second conveying means with the flight remote from the first conveying means being lower than the flight more adjacent thereto whereby tapered and leading objects conveyed into the first orienting means are conveyed outwardly therefrom with opposite ends leading.

A further object of this invention is to provide novel orienting apparatus of the type set forth wherein a mass of the objects are initially singularized through an apertured vibrating conveyor trough.

A further object of this invention is to provide novel orienting apparatus of the type heretofore described wherein singularized objects are conveyed along two incline conveyors, the latter of which operates at a faster speed than the former to provide spacing between the singularized objects.

Still another object of this invention is to provide novel orienting apparatus wherein means are provided adjacent the first conveying means cooperative with the first cooperative orienting means for defining a pivot point about which the objects pivot during the movement thereof from the first conveying means along the curved guide surface.

Another object of the invention is to provide a novel apparatus of the type heretofore set forth wherein means are provided for adjusting the curvature of the curved guide surface.

Another object of this invention is to provide novel orienting apparatus of the type set forth heretofore wherein means are provided for adjusting the location of said pivot point defining means relative to the direction of travel of the first conveyor means.

Still another object of this invention is to provide novel orienting apparatus as set forth heretofore including means for wetting the incline support surface to enhance its lubricity.

Yet another object of this invention is to provide final orienting means in the form of at least a pair of flights of the second conveyor means which diverge in the direction of travel thereof.

Another object of this invention is to provide novel apparatus for orienting objects of the type set forth including third conveyor means below the second conveying means for conveying objects along a path opposite to that of the second conveying means toward processing machinery.

Still another object of this invention is to provide novel means in orienting apparatus of the type set forth for selectively adjusting the divergence of the pair of flights of the final orienting means.

A final object of this invention is to provide a novel method of orienting objects which are at least partially tapered by conveying the objects along a first path in a first direction, offering resistance to tapered leading ends of the objects while at the same time guiding the same toward a second conveying path moving in a direction opposite to the first path, and imparting rotation to the objects about their longitudinal axes in a direction rotating toward the second conveying means whereby tapered end leading objects upon the first conveying means travel upon the second conveying means with opposite ends leading.

With the above and other objects in view that will hereinafter appear, the nature of the invention will be more clearly understood by reference to the following detailed description, the appended claims and the several views illustrated in the accompanying drawings. IN THE DRAWINGS FIG. 1 is a schematic perspective view of the novel orienting apparatus of this invention, and illustrates the following major components between infeed and discharge end portions of the apparatus, namely, means for conveying a mass of objects and thereafter singularizing the same for delivery by a chute to a second conveyor operating at a slower speed than an in line third conveyor, first orienting means having first, second and third cooperative orienting portions in the form of a respective curved guide surface, an inclined supporting surface, and at least two flights of a fourth conveyor at different elevations, the latter flights further constituting final orienting means due to the divergence thereof in the direction of travel.

FIG. 2 is an enlarged sectional view taken generally along line 2—2 of FIG. 1, and illustrates details of the orienting apparatus, particularly the chute leading from the singularizing means, the second conveying means, the two flights of the fourth conveyor at different elevations, and a fifth conveyor for conveying the orienting objects to processing machinery.

FIG. 3 is a schematic side elevational view of the second and third conveying means, and illustrates the later at a lower elevation than the former to prevent tip leading objects from being flipped 180°.

FIG. 4 is a schematic top plan view of the orienting area of the apparatus, and illustrates the manner in which a tapered tip leading object on the third conveyor is guided by the first cooperative orienting portion and rotated by the second and third cooperative orienting portions to reorient the same such that the opposite or butt end is leading during its conveyance by the fourth conveying means.

FIG. 5 is a side elevational view looking from bottom to top in FIG. 4, and additionally illustrates the manner in which an object butt leading on the fourth conveying means will drop generally directly vertically downwardly upon the fifth conveying means such that the tip end will lead toward the processing machinery.

FIG. 6 is a schematic top plan view similar to FIG. 4 and illustrates the manner in which a butt end leading object of the third conveyor remains butt end leading on the fourth conveyor.

FIG. 7 is a side elevational view of FIG. 6, and additionally illustrates the manner in which a misoriented ear which is tip leading on the fourth conveyor is pivoted generally adjacent its butt end to become properly tip leading upon the fifth conveyor.

Figure 8:
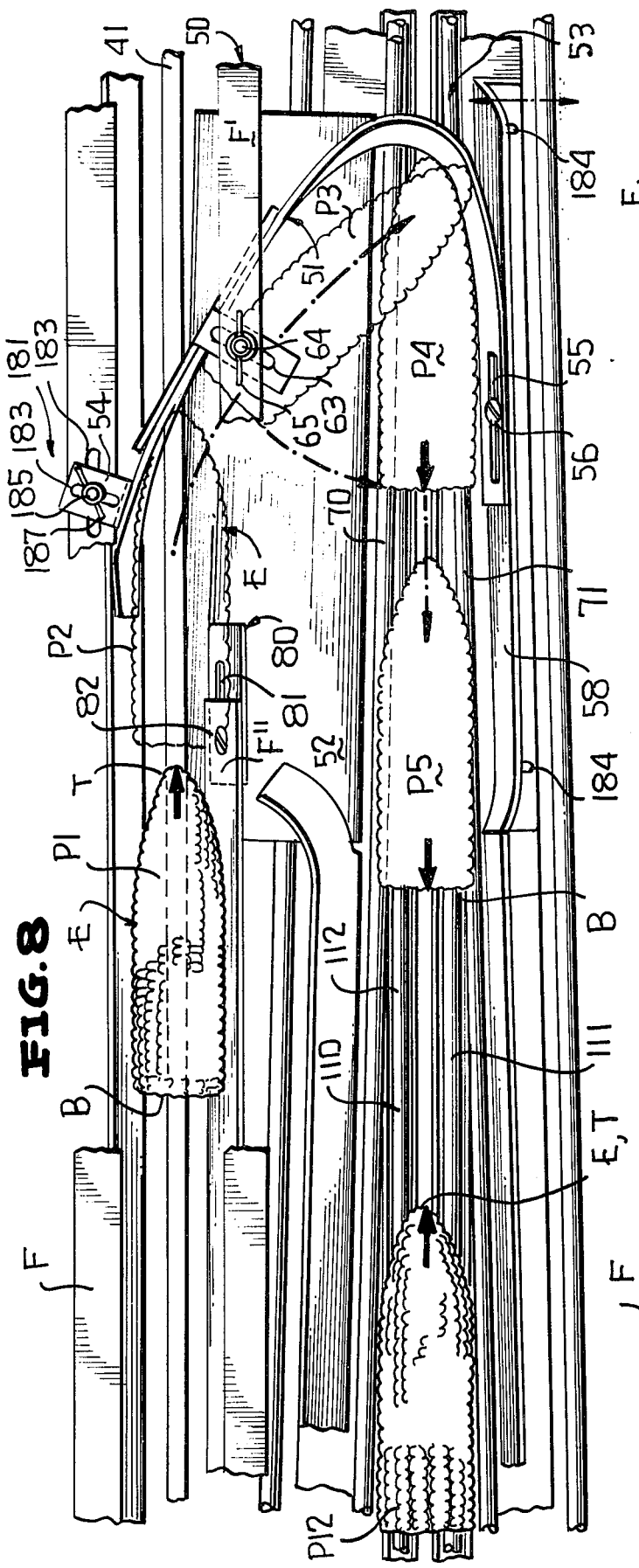

FIG. 8 is a highly enlarged view of the encircled portion of FIG. 4, and more clearly illustrates the manner in which tip leading objects on the third conveyor are oriented to become butt leading upon the fourth conveyor, with a view additionally illustrating means for adjusting the curved guide surface and adjustable means defining a pivot point for the objects adjacent an entrance end portion of the curved guide surface.

FIG. 9 is an enlarged sectional view taken generally along line 9—9 of FIG. 5, and additionally illustrates the manner in which objects leading tip first on the third conveyor are oriented to lead butt first on the fourth conveyor, but more specifically illustrates two flights of the latter conveyor having different elevations.

FIG. 10 is a view identical to FIG. 9 but illustrates the manner in which an object leading butt end on the third conveyor remains in butt end leading relationship on the fourth conveyor.

FIG. 11 is a cross sectional view of the third conveyor looking toward the curved guide surface, and merely illustrates use of a pair of conveyors instead of a single conveyor to prevent object wobble.

FIG. 12 is a similar cross sectional view of the third conveyor having a concave upper surface which precludes object wobble during conveyance.

Figure 13:
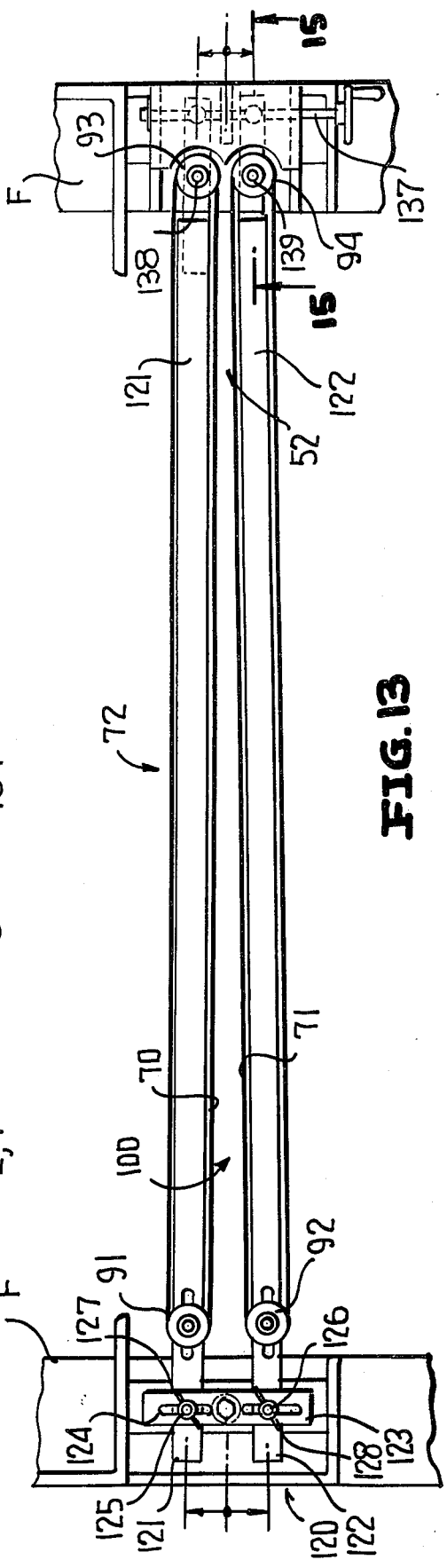

FIG. 13 which appears on a sheet of drawing containing FIG. 8, illustrates the manner in which the support conveying means diverges from right-to-left in its direction of travel and illustrates means at opposite ends thereof for adjusting the gap between adjacent flights.

Figure 14:
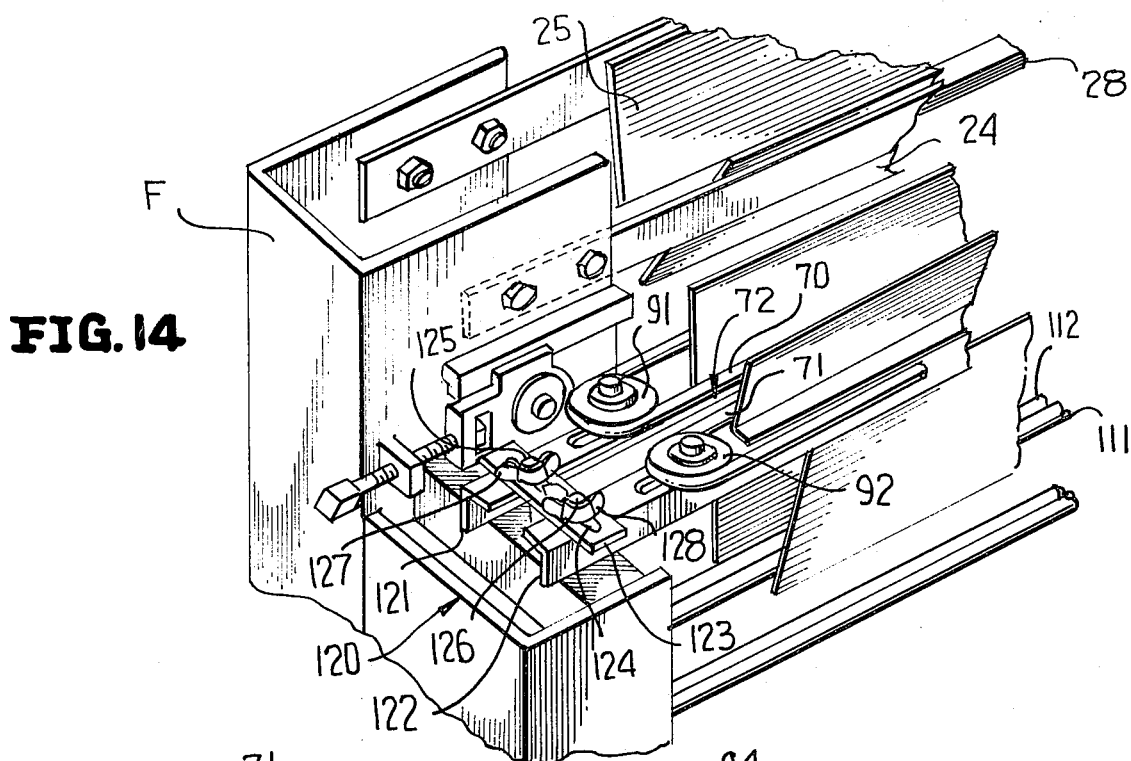

FIG. 14 is a perspective view of the left hand side of FIG. 13, and illustrates the means for adjusting the flights of the fourth conveyor.

Figure 15:
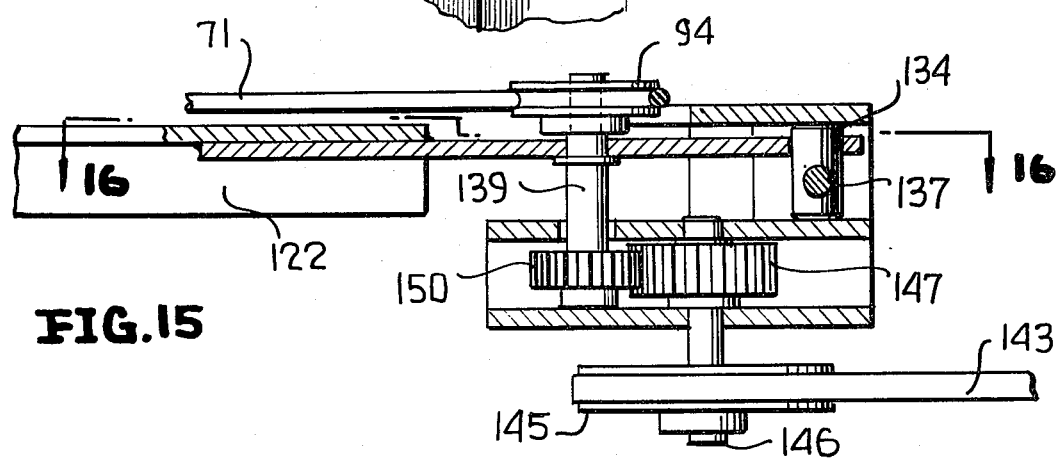

FIG. 15 is an enlarged sectional view taken generally along line 15—15 of FIG. 13, and illustrates details of the adjusting means at the right hand end of the fourth conveying means as viewed in FIGS. 13 and 1.

Figure 16:
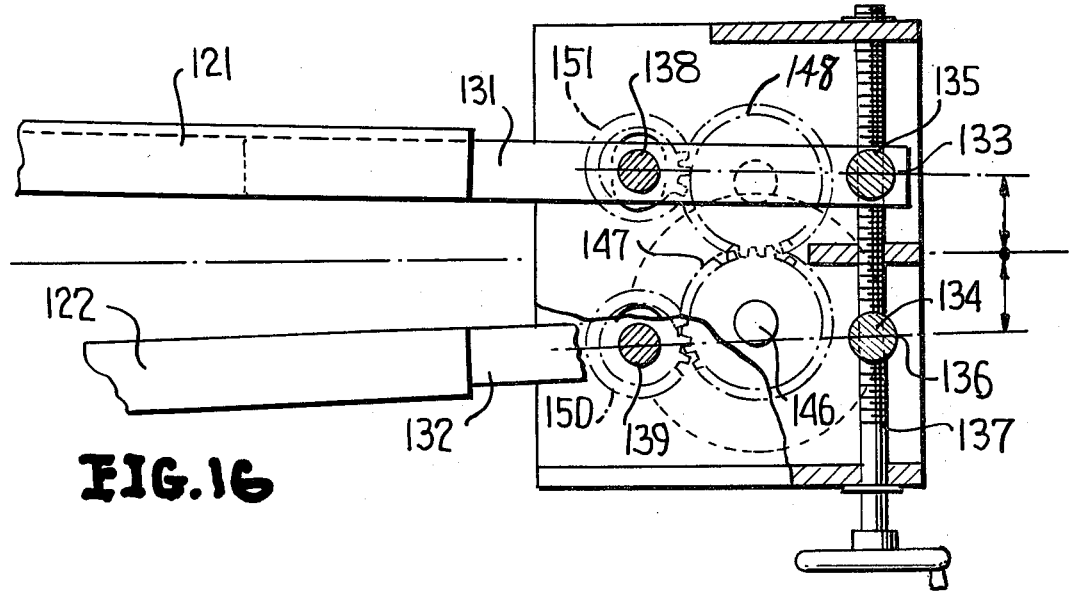

FIG. 16 is a sectional view taken generally along line 16—16 of FIG. 15, and illustrates further details of the gap adjustment at the right-hand end of the fourth conveyor.

Reference is first made to FIG. 1 of the drawings which illustrates a novel apparatus for orienting objects in keeping with this invention, the apparatus being generally designated by the reference numeral 10. The apparatus 10 includes first conveying means 11 for conveying a mass of objects along a first predetermined path in a first direction generally illustrated as uupwardly and to the left in FIG. 1.

The objects which are conveyed by the first conveying means 11 are at least partially tapered at one end and most typically the apparatus 10 is designed to orient husked or unhusked ears E of corn which for convenience are shown as being husked and include tip ends T of a tapered configuration and butt ends B of a generally non-tapered or generally cylindrical configuration. Though the machine 10 is specifically designed for orienting ears E of corn, other objects may be oriented thereby be they food products or simply articles of manufacture, as, for example, conventional tapered bobbins.

The first conveying means 11 is preferably in the form of a conveyor trough of a generally U-shaped configuration having a bottom wall 12 and a pair of upstanding side walls 13, 14. The bottom wall 12 includes means for singularizing the ears E of corn, the singularizing means being generally designed by the reference numeral 15 and being formed by an aperture of a generally rectangular or similar configuration into which the ears E are directed by an adjacent gate 16. The size of the opening 15 may be made adjustable in any conventional manner to vary the width and length dimensions and may be of a shape other than purely polygonal, rectangular or square depending upon the specifics of the articles E which are to be passed therethrough in a singular fashion. The first conveying means 11 is vibrated from a conventional motor 17 whose output shaft (unnumbered) is coupled eccentrically to a crank 18 coupled in turn conventionally to the conveyor 11. Thus, the eccentric mounting of the arm 18 imparts reciprocal vibratory motion to the conveyor 11 resulting in the feed of the objects in the direction of the unnumbered arrows associated with the conveyor 11 toward and individually into the opening 15 guided thereinto by the gate or deflector 16. Some of the objects E may pass through the gap between the downstream end (unnumbered) of the gate 16 and the wall 14, and if so, the structure of the conveyor 11 heretofore described is reproduced at one or more stations downstream from that illustrated in FIG. 1 to singularize any such objects E passing the singularizing means 15. Such objects may be conventionally conveyed to the machine 10 or simply processed in another machine identical to that of the machine 10 to be described hereinafter.

After each ear of corn passes through the opening 15 it slides down a chute 20 (FIGS. 1 and 2) which includes a bottom wall 21 and a pair of side walls 22, 23 converging in a downward direction. The side walls 22, 23 are adjacent and inboard of respective side walls or guides 24, 25 constructed from relatively flexible metallic material. At times one object may follow another object so closely that if the first object hesitates for any reason a "choke" might result if the vertical sides or guides 24, 25 were solidly mounted and thus the upper ends are free. A choke is simply a condition at which two or more objects or ears E arrive at a point of any of the paths of travel at which jamming or non-feeding takes place and such is reduced in the presently described area by virtue of the flexibility of the guides 24, 25 and the free upper ends thereof.

The guides 24, 25 are suitably welded or otherwise secured to a machine frame F (FIG. 2) and lower end portions 26, 27 thereof (FIG. 2) converge toward each other to direct the ears E toward an upper flight 28 of second conveying means 30 for conveying the ears E from left-to-right as viewed in FIG. 1 noting the arrows associated with the upper flight 28. The second conveying means 30 is entrained about a pair of appropriate conventional pulleys 31, 32 journalled for rotation in the machine frame F with the pulley 31 being coupled by a shaft 39 to a sprocket 33 which in turn is coupled to a sprocket 34 (FIG. 1) by a chain 35. The sprocket 34 is appropriately rotated through a gear reducer 36 or similar transmission mechanism from an electric motor 37. Thus, individual objects or ears E which are deposited upon the upper flight 28 move from left-to-right as viewed in FIGS. 1 and 3 toward third conveying means, generally designated by the reference numeral 40 which likewise includes an upper flight 41 for continuing the movement of the objects E from left-to-right in FIGS. 1 and 3. The third conveying means 40 is another conveyor belt entrained about a pair of pulleys 42, 43 which are appropriately journalled for rotation in the machine frame F. Again referring to FIG. 1, the pulley 42 is keyed to a shaft 44 which is in turn keyed to a pulley 45 about which is entrained a belt 46 (FIG. 2 also), and about a pulley 47 which is keyed to the shaft 32 and is thus driven from the sprocket 33. In this manner, both conveyors 30, 40 are driven from a common source with their upper flights 28, 41, respectively moving in the same in-line direction. However, as is best illustrated in FIG. 3 it will be noted that the pulley 42 of the conveyor 40 is of a lesser diameter than the pulley 32 of the conveyor 30. Moreover, there is also a reduction in drive between the conveyor 30 and the conveyor 40 such that the upper flight 41 of the latter travels faster than the upper flight 28 of the former. These two features respectively preclude tip T leading ears E from flipping 180° during the transition between the flights 28, 41, as at times occurs when these flights are in the same horizontal plane, and increase the spacing of the singularized ears on the flight 41 as compared to the flight 28 due to the increase speed heretofore noted.

Adjacent the exit end portion (unnumbered) of the third conveyor 40 of the machine 10 is first orienting means, generally designated by the reference numeral 50 which includes first, second and third cooperative orienting means 51, 52, 53, respectively, illustrated best in FIGS. 8, 9 and 10 of the drawings to which attention at this time is specifically directed.

The first cooperative orienting means of portion 51 of the first orienting means 50 is a plate of relatively resilient metallic material, such as stainless steel, which is rigidly secured by a bracket 54 (FIGS. 8 and 9) to the frame F and has an opposite end provided with elongated slot 55 which receives a bolt 56 passing through an opening 57 (FIG. 9) of a plate 58 welded to the frame F with a wing nut 59 secured to the bolt 56 to maintain the end of the guide means 51 adjusted at any selected position lengthwise of the slot 55. Between the two ends (unnumbered) of the guide plate 51 is another adjusting means which includes an arm 61 positioned against the guide plate 51 and being integral with an arm 62 at a 90° angle thereto and having a slot 63 for receiving a bolt 64 which passes therethrough and through an aperture or opening (unnumbered) in a portion F1 of the frame F. Another wing nut 65 holds the plates 61 adjusted at any position of the slot 63 relative to the bolt 64 to vary the angle of the portion of the guide surface 51 adjacent the bracket 54. Thus, the first cooperative orienting means 51 may be adjusted to preferably provide a gradual curvature away from the upper flight 41 of the conveyor 40 which becomes more abrupt at approximately the area of the third cooperative orienting means 53 and thereinafter gradually lessens to the left as viewed in FIG. 8. It has been found that, as best illustrated in FIG. 8, an ear of corn or similar object E introduced into the orienting means 50 with its tip T leading in the direction of travel of the third conveyor flight 41 will depart from the orienting means 50 upon flights 70, 71 (FIG. 8) of fourth conveyor means 72 with the butt end B leading in the direction of the travel of the flights 70, 71 which is right-to-left in FIGS. 1 and 8. At this point it is mentioned that tip end leading and butt end leading is specifically to denote that portion of the ear E leading relative to the particular conveyor causing the conveyance thereof. It has also been found that a butt end B leading ear E departing the flight 41 of the conveyor 40 will be conveyed butt end first upon the flights 70, 71 of the conveyor 72. Thus, whether tip end or butt end leading upon the flight 41 substantially all ears E depart from the orienting means 50 with the butt end leading upon the conveyr 72, as will be more fully described hereinafter.

The second cooperative orienting means 52 is simply a supporting plate which is welded or otherwise joined to the frame F and is inclined downwardly from the upper flight 41 of the conveyor 40 downwardly and to the right, as viewed in FIGS. 9 and 10, toward the third cooperative orienting means 53. As is perhaps best apparent from FIGS. 8 and 9, the inclination of the support 52 serves to cause each ear E which is tip end leading into the guide surface 51 to rotate butt wise downwardly and to the left, as indicated in FIG. 8, toward and upon the flights 70, 71 of the fourth conveyor 72.

The third cooperative orienting means 53 of the first orienting means 50 is actually simply a different elevation between the flights 70, 71 of the fourth conveying means 72, as is perhaps best illustrated in FIGS. 9 and 10. Thus, the flight 70 most closely adjacent the means 52 and the conveyor 40 is at a higher elevation than the flight 71 remote therefrom. This difference in elevation has a direct effect upon an ear depending upon whether it is travelling butb B or tip T first, as will be described hereinafter. However, reference is first made to FIGS. 8, 9 and 10 which illustrate means generally designated by the reference numeral 80 in the form of a plate having a slot 81 adjustably secured by suitable means 82 to a portion F″ of the frame F. The means 80 cooperates with the entrance end portion (unnumbered) of the guide surface 51 to define a pivot point for the ears E during the transition period between the departure thereof from the upper flight 41 of the conveyor 40 and the subsequent guidance thereof to the third cooperative orienting means 53. As is most apparent from FIG. 8, the pivot point, as determined by the rightmost edge of the plate 80, may be adjusted leftwise or to the right as viewed in this same figure.

In order to describe the manner in which the first orienting means 50 is operative, it will be assumed that the ear E being fed by the upper flight 41 of the third conveying means 40 toward the orienting means 50 is disposed with its tip T leading, and in this regard reference is made to FIGS. 4, 5, 8 and 9 of the drawings. At a position P1 (FIG. 8) the ear E approaches the entrance end portion of the guide surface 51 and the gate 80 and continues being conveyed by by the upper flight 41 until in the tip-first position P2 (FIGS. 4, 5 and 8) its tip T contacts the guide surface 51 adjacent the entrance end portion. At this point the ear E at position P2 is under the influence of the forward motion imparted thereto by the upper flight 41 of the conveyor 40, the resistance offered by the curved surface 51, and the control or guidance offered by the edge of the plate 80. As the ear E proceeds from position P2 to position P3 the inclination of the supporting surface 52 comes into play and there is thus a tendency for the ear E to roll downward and leftward as indicated by the associated unnumbered arrow in FIG. 8, particularly in view of the fact that the trailing butt end B possesses more mass and because the tip T at position P3 is in contact with the abrupt curvature of the guide surface 51 and is essentially precluded from moving tip-first beyond the position illustrated at P3. Moreover, since the tip T is tapered it will not contact the lower flight 71 of the third cooperative means 53, as is most apparent from FIG. 9, and thus the ear E from position P3 will simply roll to position P4 during which motion the gap between the upper surface of the flight 70 and the ear E will reduce as the taper of the end E becomes relatively less due to the approach of the butt end B toward the flight 70. Thus, during a particular position between positions P3 and P4 the flight 70 will contact the ear E remote from the tip T and thus propel the butt B to the left prior to the flight 71 coming into play resulting in the ear E moving to position P4 after which both flights 70, 71 move the same to position P5 and therebeyond.

Assuming that the ear E approaching the orienting means 50 upon the upper flight 41 of the conveyor 40 is travelling butt B end first, the butt end contacts the guide surface 51 at its entrance end portion (unnumbered) in the manner indicated at position P6 in FIG. 6. However, due to the tapered end T trailing in FIG. 6 on the flight 41 of the conveyor 40 the pivoting of the ear E at the edge of the plate 80 tends to occur more rapidly than that relative to FIG. 4 and thus the ear E has a tendency to swing to position P7 as opposed to being simply guided to position P3 in FIG. 4. With the butt end B leading at position P7 the inclination of the support 52 has a tendency to throw the tip end clockwise from position P7 to position P8 due to the pivot point at the edge of the plate 80 and the rolling effect produced on the ear E by the inclined support 52. However, as the ear E approaches position P8 its butt end B will contact the higher elevated flight 70 (FIG. 10) which since moving to the left as viewed in FIG. 6 will immediately propel the ear from position P8 to the left toward position P9 and then onwardly to position P10. Thus whether the ear is tip leading on the upward flight of conveyor 40 (FIG. 4) or butt leading (FIG. 6) of this same flight the ears leave the orienting means 50 for the most part butt leading upon the conveying means 72.

Referring particularly to FIGS. 1, 2 and 13 of the drawings, the fourth conveyor means 72 is entrained about a plurality of pulleys 91 through 94 which are mounted for selective transverse adjustment at opposite ends of the conveying means 72 to achieve a final orientation by means generally designated by the reference numeral 100 which is simply the divergence of the flights 70, 71 from right-to-left, as viewed in FIG. 13. In other words, the flights 70, 71 define the third cooperative orienting portion 53 of the first orienting means 50 due to the difference in the elevations therebetween (FIGS. 9 and 10), and also define separate and distinct orienting means 100 by virtue of the divergence right-to-left therebetween in FIG. 13. Referring specifically to FIGS. 4 and 5, an ear E at position P11 moving properly upon the flights 70, 71 butt end B first will be carried therealong until the flights 70, 71 reach a distance therebetween at which the ear E will drop to position P12 upon flights 111, 112 of a conveyor 110. The tip T in position P11 may turn slightly clockwise prior to dropping to position P12, but due to the mass of the ear E being located more to the left of center due to the heavier butt end the ear will be deposited upon the conveyor 110 in such manner as to be conveyed to the right as viewed in FIG. 5 with its tip end T leading. This represents perfection in orientation irrespective of whether an ear was directed to the first orienting means 50 tip-first or butt-first since it arrived at position P11 properly butt-first and departs from position P12 tip-first. However, an improperly oriented ear is shown in FIGS. 6 and 7 at position P13. Any car E leaving the orienting means 50 upon the conveyor 72 tip end T first is considered improperly oriented, and such will on occasion occur. However, due to the divergence in the leftward direction of the flight 70, 71 the ear E will tend to rock counter-clockwise as viewed in FIG. 7, with a pivot point being established progressively toward the butt end B of the ear E until the divergence between the belts become greater in dimension than the diameter of the car at which point its swinging momentum along with the tip end T contacting the conveyor 110 will swing the ear from position P13 to P14 and subsequently therealong to position P15 to suitable processing equipment 180.

Reference is particularly made to FIG. 2 which illustrates the fifth conveying means 110 including upper flights 111 and 112 supported therebeneath by upwardly opening generally U-shaped tracks 113, 114, respectively. The tracks 113, 114 run the length of the flights 111, 112 beneath the fifth conveying means 110 to preclude the upper flights 111, 112 from bouncing excessively to thereby assure that any ear deposited upon the flights 111, 112 will maintain its deposited position thereupon.

In order to assure proper secondary orientation by means of the divergent nature of the flights 70, 71 the final diverging means 100 includes as a part thereof means 120 (FIGS. 13 and 14) for varying the distance between the pulleys 91, 92. The means 120 includes a pair of rails or angle irons 121, 122 which span opposite sides of the frame F illustrated in FIG. 13. The rails 121, 122 rest upon the frame and are overlyingly spanned by a bridging member 123 having a slot 124. A pair of studs 125, 126 fixed to the frame F pass through the slot 124 and receive wing nuts 127, 128 respectively. When the wing nuts 127 and/or 128 are loosened the rails 121, 122 can be relatively moved to increase or decrease the spacing therebetween which when selectively obtained can be fixed by simply tightening the wing nuts 127, 128. Movement of the rails 121, 122 adjust the distance between the flights 70, 71 since the pulleys 91, 92 are suitably journalled to the respective rails 121, 122.

At the right hand end of the rails 121, 122, as viewed in FIG. 13, the same are connected to plates 131, 132 by welding or the like. The plates 131, 132 are pivoted to respective studs 133, 134 by apertures 135, 136, respectively. The studs are threaded and receive a hand screw 137 which when rotated in one direction will move the studs 133, 134 away from each other and in an opposite direction toward each other whereupon the rails 131, 132 will be likewise moved. Accordingly, since the pulleys 93, 94 are keyed to respective shafts 138, 139 which are journalled for rotation in openings (unnumbered) of the respective rails 131, 132, the rotation of the screw 137 will likewise move the pulleys 93, 94. Obviously, since the flights 70, 71 are entrained about the respective pulleys 93, 94 the same can be adjusted as desired upon rotation of the hand screw 137.

The drive mechanism for the fourth conveying means 72 is best shown in FIGS. 1, 15 and 16 and includes a motor 140 operating through a reduction gearing or a similar transmission 141 to drive through a sprocket or pulley 142 a belt or chain 143 which in turn through appropriate idler pulleys or sprockets 144 is entrained about a sprocket 145. The sprocket 145 is keyed to a shaft 146 (FIGS. 15 and 16) to which is additionally keyed a gear 147. The gear 147 meshes with a gear 148 and these gears are in turn respectively meshed with gears 150, 151. Thus rotation imparted to the gear 145 is transmitted to the gears 147, 148 which in turn to the gears 150, 151 impart rotation to the shafts 139, 138 and thus rotate the pulleys 94, 93 to impart appropriate movement to the flights 70, 71 which is, of course, right-to-left as viewed in FIGS. 1 and 13 of the drawings.

Though details of the preferred embodiment have been described it is to be understood that modifications and/or additions may be made thereto without departing from the spirit and scope thereof. As an example, reference is made to FIGS. 1 and 5 which illustrate nozzle means 160 which through a conduit 161 is coupled to a suitable source of liquid, such as water from a conventional tap, to direct the same upon the various elements of the orienting means 50 as well as the exit end portion of the upper flight 41 of the conveyor 40 and the entrance end portion of the upper flights 70, 71 of the conveyor 72. By wetting this area and particularly the inclined support 52 it is assured that starch build-up from ears of corn is precluded and thus the efficiency of the machine 10 is not reduced during prolonged operation.

In lieu of any of the single flight conveyor belts as for example the conveyors 30 or 40, the same may be substituted for by a pair of conveyors 171, 172 (FIG. 11) to preclude the ears E from wobbling while they are conveyed or by a belt 173 (FIG. 12) having an upwardly opening concave surface 174 which in effect maintains two points 175, 176 contact with the ear E illustrated associated therewith.

As was heretofore noted, the particular utilization of the ears upon reaching the fifth conveyor 110 is of no particular significance but the conveyor 110 may be, for example, driven from a suitable electric motor 179 through a transmission 188 and appropriate drive mechanism 189 to move the flights 111, 112 to the right as indicated by the unnumbered headed arrow associated therewith toward a final processing mechanism 180. As an example of the mechanism 180, reference may be made to commonly assigned application Ser. No. 175,192 in the name of Paul F. Cover et al, entitled CORN CUTTING MACHINE AND METHOD.

Additional details of the machine considered within the scope of the invention are, for example, additional adjusting means 181, 182 associated with the first cooperative orienting means 51 for adjusting the same laterally or transversely relative to the path of travel of the various conveying means. Each of the means 181, 182 includes respective slots 183, 184 through which are received respective bolts 185, 186 carrying wing nuts 187, 188. The orienting means 51 thereby can be adjusted transversely to accommodate ears E or similar objects of varying contours, particularly in regard to the thickness or diameters thereof.

It is also within the scope of this invention to mount the second cooperative orienting means 52 in such a manner that its upper surface (unnumbered) may be selectively inclined in varying degrees relative to the horizontal. This may be done by, for example, pivoting one end of the support 52 and adjustably locking the end remote therefrom at one of a selected number of vertical heights.

In further keeping with this invention, the various conveying means 30, 40, 72, 110, etc. may be adjusted in height. This is particularly true in regard to the distance between the conveying means 72 and 110. It has been found that at times there is an optimum distance between the upper run of the conveyors 72, 110 particularly when small ears of corn drop from the conveying means 72. By achieving a desired distance the ears will not bounce undesirably and reorient in an undesired fashion.

We claim:

1. Apparatus for orienting objects which are at least partially tapered comprising first means for conveying a mass of said objects along a first path, means for singularizing the mass of objects, second means for conveying the singularized objects along a second path, third means following said second conveying means for conveying the singularized objects along a third path at a speed faster than that of said second path, means following said third conveying means for first orienting said singularized objects such that substantially all objects conveyed from said orienting means have like contoured ends leading, fourth means for conveying the oriented objects along a fourth path, said fourth conveying means including as a part thereof second means for orienting any of the objects misoriented by said first orienting means whereby substantially entirely all objects conveyed from said second orienting means have like contoured ends leading, and fifth means for conveying the objects along a fifth path for ultimate processing.

2. The orienting apparatus as defined in claim 1 wherein said first conveying means includes a conveyor trough, means for vibrating said conveyor trough to move the mass of objects therealong, said singularizing means is an opening in said trough of a predetermined size through which individual objects pass under the influence of the vibrating conveyor trough, said third conveying means includes an upper flight below the level of an upper flight of said second conveying means whereby objects with tapered ends leading will not be reoriented, said first orienting means includes first, second and third cooperative orienting means, said first cooperative orienting means includes means defining a guide surface for diverting objects from said third conveying means to said fourth conveying means, said second cooperative orienting means includes means defining a support surface along which said objects move between said third and fourth conveying means, said support surface being inclined downwardly from said third conveying means toward said fourth conveying means, said third cooperative orienting means includes at least a pair of adjacent upper flights of said fourth conveying means with the flight remote from said second cooperative orienting means being lower in elevation than the flight more adjacent thereto, and said second orienting means includes at least a pair of upper flights diverging in the direction of travel of said fourth conveying means.

3. Apparatus for orienting elongated objects which are at least partially tapered at one end comprising first means for conveying said objects randomly with different ends leading along a first generally horizontal path in a first direction second means for conveying said objects along a second generally horizontal path in a second direction opposite and generally parallel to said first direction, means between said first and second conveying means for orienting said objects such that substantially all objects conveyed by said second conveying means have like contoured ends leading, and said orienting means including at least means defining a curved guide surface forming a generally horizontal transition path between said first and second paths.

4. The apparatus as defined in claim 3 including means for adjusting the curvature of said curved guide surface.

5. The apparatus as defined in claim 3 wherein the curvature of said guide surface is gradual immediately adjacent said first conveying means and is abrupt immediately adjacent said second conveying means.

6. The apparatus as defined in claim 3 including means defining a pivot point adjacent an entrance end portion of said guide surface for pivoting the objects thereabout during movement along said guide surface.

7. The apparatus as defined in claim 3 including means defining a pivot point adjacent an entrance end portion of said guide surface for pivoting the objects thereabout during movement along said guide surface, said pivot point defining means being adjacent said first conveying means and between the latter and said second conveying means, and means for adjusting the location of said pivot point defining means in said first direction.

8. The apparatus as defined in claim 3 including means defining a pivot point adjacent an entrance end portion of said guide surface for pivoting the objects thereabout during movement along said guide surface, said pivot point defining means being adjacent said first conveying means and between the latter and said second conveying means, means for adjusting the location of said pivot point defining means in said first direction and means for adjusting the curvature of said curved guide surface.

9. The orienting apparatus as defined in claim 3 wherein said orienting means further includes a support surface along which said objects move between said first and second conveying means, and said support surface is inclined downwardly from said first conveying means toward said second conveying means.

10. The apparatus as defined in claim 9 including means for adjusting the curvature of said curved guide surface.

11. The apparatus as defined in claim 9 wherein the curvature of said guide surface is gradual immediately adjacent said first conveying means and is abrupt immediately adjacent said second conveying means.

12. The apparatus as defined in claim 9 including means defining a pivot point adjacent an entrance end portion of said guide surface for pivoting the objects thereabout during movement along said guide surface.

13. The apparatus as defined in claim 9 including means defining a pivot point adjacent an entrance end portion of said guide surface for pivoting the objects thereabout during movement along said guide surface, said pivot point defining means being adjacent said first conveying means and between the later and said second conveying means, and means for adjusting the location of said pivot point defining means in said first direction.

14. The apparatus as defined in claim 9 including means defining a pivot point adjacent an entrance end portion of said guide surface for pivoting the objects thereabout during movement along said guide surface, said pivot point defining means being adjacent said first conveying means and between the latter and said second conveying means, means for adjusting the location of said pivot point defining means in said first direction, and means for adjusting the curvature of said curved guide surface.

15. The orienting apparatus as defined in claim 3 wherein said orienting means further includes a pair of adjacent upper flights of said second conveying means with the flight remote from said first conveying means being lower than the flight more adjacent thereto.

16. The orienting apparatus as defined in claim 15 wherein said pair of flights diverge in said second direction.

17. The orienting apparatus as defined in claim 15 wherein said pair of flights diverge in said second direction, and third conveying means below said second conveying means for conveying said objects along a third path in a third direction opposite said second direction.

18. The orienting apparatus as defined in claim 15 including means for selectively adjusting the divergence of said pair of flights.

19. The orienting apparatus as defined in claim 15 including means for adjusting the spacing between the pair of flights at both entrance and exit end portions of said second conveying means.

20. The apparatus as defined in claim 12 wherein said first and second conveying means are in side-by-side spaced relationship with said second conveying means being disposed below said first conveying means.

21. The apparatus as defined in claim 15 wherein said orienting means further includes a support surface along which said objects move between said entrance and exit surface portions of said guide surface, and said support surface is inclined downwardly and laterally from said first conveying means toward said second conveying means.

22. The apparatus as defined in claim 3 wherein said curved guide surface has an entrance surface portion aligned for contact by all objects conveyed in said first direction by said first conveying means, and said curved guide surface has an exit surface portion aligned for transferring all objects departing from said entrance surface portion to said second conveying means.

23. The apparatus as defined in claim 3 wherein said first and second conveying means are in side-by-side spaced relationship with said second conveying means being disposed below said first conveying means.

24. The apparatus as defined in claim 22 wherein said first and second conveying means are in side-by-side spaced relationship with said second conveying means being disposed below said first conveying means.

25. The apparatus as defined in claim 24 wherein said orienting means further includes a support surface along which said objects move between said entrance and exit surface portions of said guide surface, and said support surface is inclined downwardly and laterally from said first conveying means toward said second conveying means.

26. The apparatus as defined in claim 17 wherein said first and second conveying means are in side-by-side spaced relationship with said second conveying means being disposed below said first conveying means.

27. The apparatus as defined in claim 17 wherein said orienting means further includes a support surface along which said objects move between said entrance and exit surface portions of said guide surface, and said support surface is inclined downwardly and laterally from said first conveying means toward said second conveying means.

28. Apparatus for orienting elongated objects which are at least partially tapered at one end comprising first means for conveying said objects randomly with different ends leading along a first generally horizontal path in a first direction, second means for conveying said objects along a second generally horizontal path in a second direction opposite and generally parallel to said first direction, means between said first and second conveying means for orienting said objects such that substantially all objects conveyed by said second conveying means have like contoured ends leading, and said orienting means including at least means defining a support surface along which said objects move between said first and second conveying means, and said support surface is inclined downwardly from said first conveying means toward said second conveying means.

29. The orienting apparatus as defined in claim 28 including means for wetting the support surface to enhance its lubricity.

30. The orienting apparatus as defined in claim 28 wherein said orienting means further includes a pair of adjacent upper flights of said second conveying means with the flight remote from said first conveyong means being lower than the flight more adjacent thereto.

31. The orienting apparatus as defined in claim 25 wherein said pair of flights diverge in said second direction.

32. The orienting apparatus as defined in claim 25 wherein said pair of flights diverge in said second direction, and third conveying means below said second conveying means for conveying said objects along a third path in a third direction opposite said second direction.

33. The orienting apparatus as defined in claim 25 including means for selectively adjusting the divergence of said pair of flights.

34. The orienting apparatus as defined in claim 25 including means for adjusting the spacing between the pair of flights at both entrance and exit end portions of said second. conveying means.

35. Apparatus for orienting elongated objects which are at least partially tapered at one end comprising first means for conveying said objects randomly with different ends leading along a first generally horizontal path in a first direction, second means for conveying said objects along a second generally horizontal path in a second direction opposite and generally parallel to said first direction, said second conveying means including means for orienting said objects such that substantially all objects conveyed by said second conveying means have like contoured ends leading, and said orienting means including at least a pair of adjacent upper flights of said second conveying means with the flight remote from said first conveying means being lower than the flight more adjacent thereto.

36. A method of orienting elongated objects which are at least tapered at one end comprising the steps of conveying said objects randomly with different ends leading in a first direction toward at least two conveyors moving in the same direction but at different elevations with the elevations decreasing in said first direction whereby an object traveling in said first direction with a non-tapered end leading will immediately strike the upper conveyor and be conveyed essentially linearly thereby in a second direction with its non-tapered end leading whereas an object traveling in said first direction with its tapered end leading will first pass over the upper conveyor and thereafter strike the upper conveyor and be conveyed initially essentially rotationally and then linearly in said second direction with its nontapered end leading.

37. A method of orienting elongated objects which are at least partially tapered at one end comprising the steps of conveying said objects randomly with different ends leading along a first generally horizontal path in a first direction, offering resistance to tapered leading ends of the objects while at the same time guiding the same toward a second conveying path moving in a direction opposite and generally parallel to the first path, and imparting rotation to the objects about their longitudinal axes in a direction rotating toward the second conveying means whereby tapered end leading objects upon the first conveying means travel upon the second conveying means with opposite ends leading.

38. The method as defined in claim 28 wherein rotation is imparted to the objects by supporting the same during their transition between the first and second conveying steps in downwardly inclined attitude from the first conveying step toward the second conveying step whereby gravity imparts rotation to the objects.

39. The method as defined in claim 28 wherein rotation is imparted to the objects by the frictional contact between undersides thereof and the second conveying means at a point spaced from the point at which resistance is offered the tapered leading ends.

* * * * *